United States Patent [19]
Willems

[11] 3,799,215
[45] Mar. 26, 1974

[54] WELDING WIRE DRIVING AND STRAIGHTENING DEVICE

[75] Inventor: Gerardus Antonius Maria Willems, Emmasingel, Eindhoven, Netherlands

[73] Assignee: U.S. Philips Corporation, New York, N.Y.

[22] Filed: Nov. 15, 1972

[21] Appl. No.: 306,899

[30] Foreign Application Priority Data
Nov. 19, 1971  Netherlands....................... 7115945

[52] U.S. Cl..................... 140/147, 72/183, 219/130
[51] Int. Cl.............................................. B21f 1/02
[58] Field of Search ....... 219/130; 140/147; 72/160, 72/164, 183

[56] References Cited
UNITED STATES PATENTS
2,302,781  11/1942  Forge.................................. 219/130
3,107,291  10/1963  Evans et al. ......................... 219/130
3,249,276  5/1966  VanBergen et al.................. 219/130
3,595,277  7/1971  Lefever............................... 140/147

FOREIGN PATENTS OR APPLICATIONS
39,855  8/1936  Netherlands.......................... 72/183

*Primary Examiner*—Lowell A. Larson
*Attorney, Agent, or Firm*—Frank R. Trifari

[57] ABSTRACT

A device for driving and straightening welding wire comprising a supply reel and a driving and straightening mechanism having two pairs of transport rollers and one straightening roller which is arranged between the transport rollers. The shaft of the straightening roller is located on the side of the common tangential plane of the transport rollers facing the supply reel. The straightening roller is adjustable both in its axial direction and in a plane at right angles to the axial direction. The device is particularly suitable for straightening welding wires to be supplied at high speed in plasma-MIG welding processes.

3 Claims, 3 Drawing Figures

WELDING WIRE DRIVING AND STRAIGHTENING DEVICE

The invention relates to a welding wire driving and straightening device comprising a supply reel for welding wire, and a driving and straightening mechanism having transport and straightening rollers, the shaft of the rollers and of the supply reel being parallel to each other, at least one of the rollers being adjustable in a plane at right angles to its axis. In such a known device in which the driving and straightening mechanism comprises totally six rollers, two adjustable rollers are placed on the convex side of the unwound welding wire remote from the supply reel. Practice has proved that said known device does not fulfil the high requirements which in particular during plasma-MIG welding are imposed upon the straightening of the welding wire.

In plasma-MIG welding, comparatively small deviations in the direction of the wire result in disturbances in the welding process. As a matter of fact the welding wire is guided through a contact tube and through a nozzle of the welding torch and must follow the axis of the plasma over a considerable length of approximately 50 mm. The arc should accurately follow the seam to be welded; too large a deviation in the direction of the welding wire results in a wrong point of engagement of the arc on the workpiece, namely beside the seam to be welded. Moreover, the current-conveying welding wire may not touch the nozzle ; an arc between the nozzle and the workpiece would be the result of this. In plasma-MIG welding very high wire speeds are used which are from three to four times as large as in the conventional MIG welding, in the order of magnitude of 50 m/minute. In view of these high wire speeds, it should be possible to rapidly and accurately correct any deviation in the direction of the welding wire.

It is the object of the invention to provide a device of the type mentioned in the preamble which enables welding wires to be straightened within very narrow tolerances and which is particularly suitable for straightening wire driven at a comparatively high speed.

According to the invention this object is mainly achieved by two pairs of transport rollers having a common tangential plane and by an adjustable roller which exclusively serves as a straightening roller and which is arranged between the two pairs of transport rollers, the shaft of the straightening roller being located on the side of said tangential plane facing the supply reel.

Experiments have demonstrated that as a result of said surprisingly simple measure, in particular as a result of the characterized arrangement of the straightening roller, the deviations in the direction of the welding wire near the welding seam can be restricted to 1 mm at most.

By suitable adjustment of the straightening roller in a plane at right angles to its axis, deformations of the welding wire in said plane are accurately corrected; the welding wire leaves the driving and straightening mechanism substantially without wagging in a straight line.

It would have been obvious to arrange the straightening roller on the side of the common tangential plane of the transport rollers remote from the supply reel; however, such an embodiment proved unsatisfactory in practice.

In order to compensate also for deformations of the welding wire in a plane parallel to the common tangential plane of the transport rollers, the straightening roller in a preferred embodiment of the device according to the invention is adjustable in its axial direction, a groove being provided on the circumference of the roller. As a result of this it is also possible to correct a possible inaccurate position of the supply reel.

In a further preferred embodiment of the device according to the invention a pulley is arranged between the supply reel and the driving and straightening mechanism. By leading the welding wire unwound from the supply reel over the pulley in one turn, the welding wire can be supplied to the driving and straightening mechanism with a substantially constant deformation; as a result of this it is also achieved that the direction in which the welding wire is supplied to the driving and straightening mechanism does not vary.

The invention will be described in greater detail with reference to an embodiment shown in the drawing. In the drawing.

Figure 1:
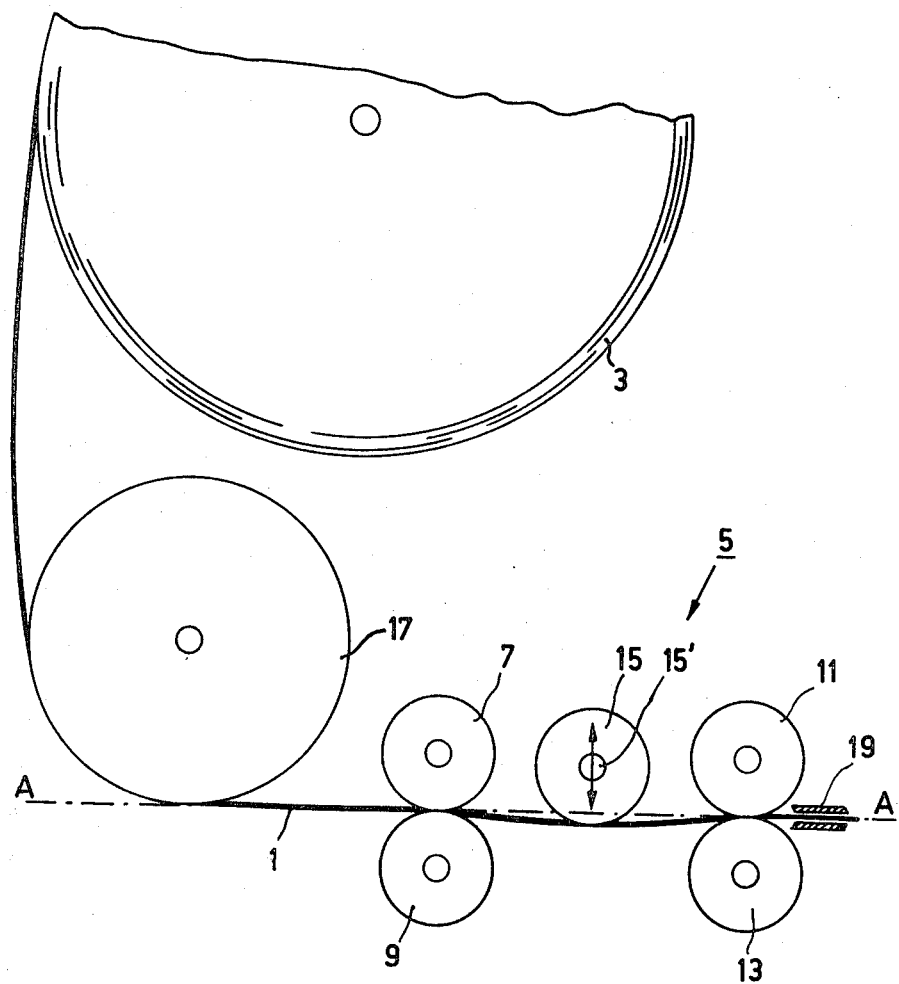
FIG. 1 shows diagrammatically a device according to the invention.

The device for driving and straightening the welding wire shown diagrammatically in FIG. 1 comprises mainly a supply reel 3 having thereon a welding wire to be unwound and to be straightened, as well as a driving and straightening mechanism 5 which is provided with two pairs of transport rollers 7 and 9 and 11 and 13, respectively, the rollers 7 and 11 which are driven serving as driving rollers, the rollers 9 and 13 serving as pressure rollers and being resiliently urged towards the driving rollers 7 and 11. A straightening roller 15 is placed between the driving rollers 7 and 11 and is intersected by the common tangential plane A—A of the two pairs of rollers, while the shaft 15' of the straightening roller is located on the side of the tangential plane A—A facing the supply reel 3. A pulley 17 is placed between the supply reel 3 and the driving and straightening mechanism 5, while the contact tube 19 of a welding torch not illustrated is shown behind the mechanism 5. The shafts of the supply reel, of the pulley, of the transport rollers and of the straightening roller are parallel relative to each other. The welding wire 1 unwound from the supply reel 3 by means of the transport rollers 7, 9, 11 and 13 is led in one turn around the pulley 17, is straightened by the mechanism 5 and passed through the contact tube 19 in a straight line.

The welding wire is supplied to the driving and straightening mechanism 5 by the pulley 17 in the plane A—A in a straight line and with a constant, determined predeformation. The wire is straightened in the mechanism 5 by the straightening roller in cooperation with the pressure rollers 9 and 13 and leaves the mechanism in a straight line in the direction of the contact tube 19.

Figure 2:
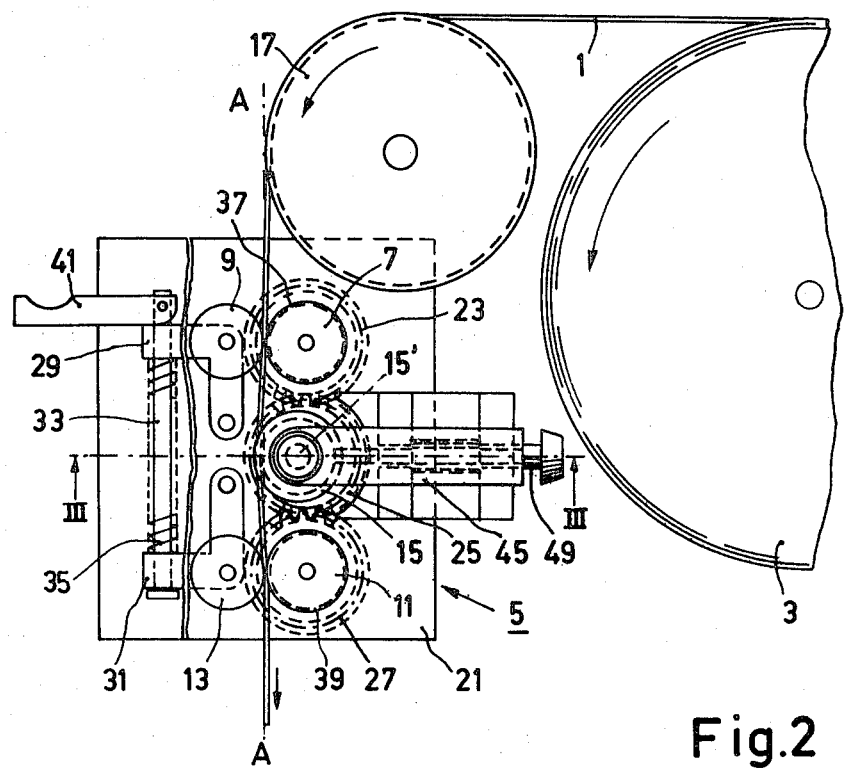
FIG. 2 is a side elevation of a practical embodiment of the device.
Figure 3:
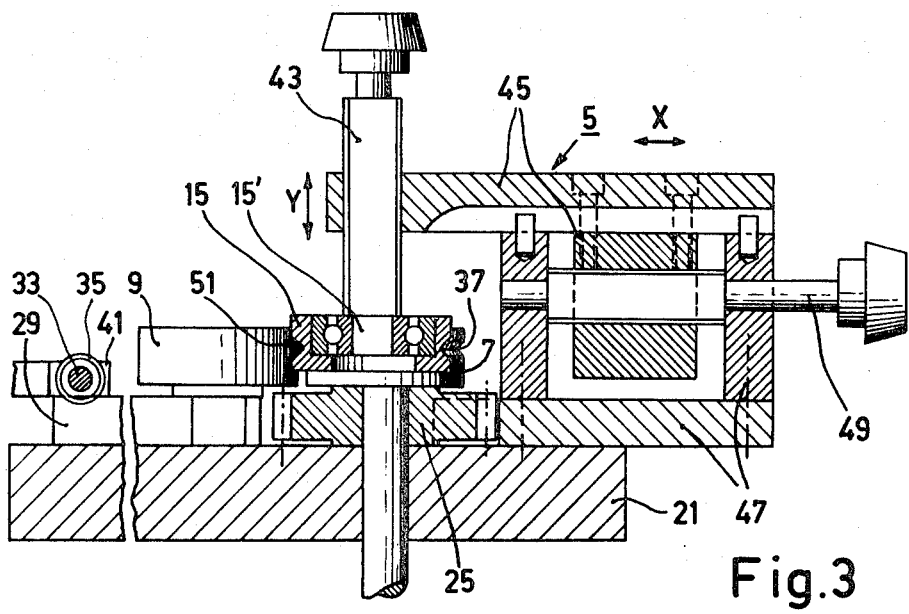
FIG. 3 is a cross-sectional view on an enlarged scale of the driving and straightening mechanism taken on the line III—III of FIG. 2.

FIGS. 2 and 3 show a practical embodiment of the driving and straightening mechanism 5. The driving rollers 7 and 11 are rotatably journalled on a support 21 and are driven by means of a set of toothed wheels 23, 25 and 27, of which the wheels 23 and 27 are connected to the driving rollers 7 and 11, while the toothed wheel 25 is driven by a motor not shown. The pressure rollers 9 and 13 are rotatably journalled on levers 29 and 31 which are pivotally secured to the support 21 and are connected together by means of a rod 33. By means of a common adjustable spring 35 the levers 29 and 31 with the pressure rollers 9 and 13 are urged in the direction of the driving rollers 7 and 11 as a result of which the welding wire 1 is pressed in V-grooves 37 and 39 on the circumference of the driving rollers. The tension of the spring 35 can be reliesed by means of a lever 41 and the pressure rollers can be lifted from the driving rollers.

The straightening roller 15 is rotatably secured on an adjusting screw 43 which is provided on a slide 45. A guide 47 for the slide is connected to the support 21. The slide 45 with the straightening roller 15 can be moved by means of an adjusting screw 49 in the direction denoted in FIG. 3 by the arrow X in a plane at right angles to the shaft 15' of the straightening roller, as a result of which deformations of the welding wire in this plane can be corrected. The straightening roller can also be moved by means of the adjusting screw 43 in the direction of the shaft 15', which direction is denoted in FIG. 3 by the arrow Y; as a result of this, deformations of the welding wire in the plane A—A can be compensated for. The straightening roller 15 is provided with a groove 51 which, however, has a larger width than the grooves 36, 39 of the driving rollers 7 and 11.

The device is particularly suitable for straightening welding wire in plasma-MIG welding which is to be supplied at a high speed. However, the device may also be supplied advantageously in conventional MIG welding apparatus in which as a result of the accurate straightening of the welding wire, the wear of the contact tubes is reduced and the possibility of the welding wire in the supply cable is improved.

What is claimed is:

1. A welding wire driving and straightening device comprising a supply reel for welding wire, and a driving and straightening mechanism having transport rollers and straightening rollers, the shafts of the rollers and the supply reel being parallel to each other, at least one of the rollers being adjustable in a plane at right angles to its axis, characterized by two pairs of transport rollers having a common tangential plane and by an adjustable roller which exclusively serves as a straightening roller and which is arranged between the two pairs of transport rollers, the shaft of the straightening roller being located on the side of the said tangential plane facing the supply reel.

2. A device as claimed in claim 1, characterized in that the straightening roller is adjustable in its axial direction, a groove being provided on the circumference of the roller.

3. A device as claimed in claim 1, characterized in that a pulley is arranged between the supply reel and the driving and straightening mechanism.

* * * * *

PO-1050
(5/69)

UNITED STATES PATENT OFFICE
CERTIFICATE OF CORRECTION

Patent No. 3,799,215                    Dated    March 26, 1974

Inventor(s)  GERARDUS ANTONIUS MARIA WILLEMS

It is certified that error appears in the above-identified patent and that said Letters Patent are hereby corrected as shown below:

Col. 1, before "The invention relates" insert --ABSTRACT OF THE DISCLOSURE
    A device for driving and straightening welding wire comprising a supply reel and a driving and straightening mechanism having two pairs of transport rollers and one straightening roller which is arranged between the transport rollers. The shaft of the straightening roller is located on the side of the common tangential plane of the transport rollers facing the supply reel. The straightening roller is adjustable both in its axial direction and in a plane at right angles to the axial direction. The device is particularly suitable for streightening welding wires to be supplied at high speed in plasma-MIG welding processes.
    BACKGROUND OF THE INVENTION--

Before line 37, insert --SUMMARY OF THE INVENTION--
Col. 2, before "The device for driving" insert --DESCRIPTION OF THE PREFERRED EMBODIMENT-- line 33, delete "serving" and insert --serve--
        (both occurrences)

IN THE CLAIMS:
    Claim 1 should be amended as follows:
    A welding wire driving and straightening device comprising a supply reel for welding wire, and a driving and straightening mechanism having transport rollers and straightening rollers, the shafts of the rollers and the supply reel being parallel to each other, at least one of the rollers being adjustable in a plane at right angles to its axis, said rollers comprising two pairs of transport

PO-1050
(5/69)

UNITED STATES PATENT OFFICE
CERTIFICATE OF CORRECTION

Patent No. 3,799,215   Dated  March 26, 1974

Inventor(s)  GERARDUS ANTONIUS MARIA WILLEMS

It is certified that error appears in the above-identified patent and that said Letters Patent are hereby corrected as shown below:
(Page 2)

rollers having a common tangential plane and an adjustable straightening roller which is arranged between the two pairs of transport rollers, the shaft of the straightening roller being located on the side of the said tangential plane facing the supply reel and adjustably movable toward and into said plane.

Signed and sealed this 8th day of October 1974.

(SEAL)
Attest:

McCOY M. GIBSON JR.
Attesting Officer

C. MARSHALL DANN
Commissioner of Patents